US012496579B2

(12) United States Patent
Wegener et al.

(10) Patent No.: US 12,496,579 B2
(45) **Date of Patent: *Dec. 16, 2025**

(54) MAGNETIC SELECTOR AND SYSTEMS INCORPORATING SAME

(71) Applicant: Fenwal, Inc., Lake Zurich, IL (US)

(72) Inventors: Christopher J. Wegener, Libertyville, IL (US); James Madsen, Chicago, IL (US)

(73) Assignee: Fenwal, Inc., Lake Zurich, IL (US)

( * ) Notice: Subject to any disclaimer, the term of this patent is extended or adjusted under 35 U.S.C. 154(b) by 654 days.

This patent is subject to a terminal disclaimer.

(21) Appl. No.: 17/903,229

(22) Filed: Sep. 6, 2022

(65) Prior Publication Data

US 2023/0082317 A1 Mar. 16, 2023

Related U.S. Application Data

(60) Provisional application No. 63/242,685, filed on Sep. 10, 2021.

(51) Int. Cl.
*B01L 3/00* (2006.01)
*E05C 17/56* (2006.01)

(52) U.S. Cl.
CPC ........ *B01L 3/502715* (2013.01); *E05C 17/56* (2013.01)

(58) Field of Classification Search
USPC .......................................................... 422/502
See application file for complete search history.

(56) References Cited

U.S. PATENT DOCUMENTS

| | | | |
|---|---|---|---|
| 4,710,472 | A | 12/1987 | Saur et al. |
| 4,910,148 | A | 3/1990 | Sorensen et al. |
| 5,536,475 | A | 7/1996 | Moubayed et al. |
| 10,251,990 | B2 | 4/2019 | Wegener et al. |
| 10,274,495 | B2 | 4/2019 | Wegener et al. |
| 10,449,283 | B2 | 10/2019 | Wegener et al. |
| 11,478,755 | B2 | 10/2022 | Wegener et al. |
| 2017/0315121 | A1 | 11/2017 | Wegener et al. |
| 2018/0172685 | A1 | 6/2018 | Wegener et al. |
| 2021/0046426 | A1 | 2/2021 | Wegener et al. |

OTHER PUBLICATIONS

European Extended Search Report (EESR) from European Patent Application 22194088.5 dated Feb. 1, 2023; 10 pages.

*Primary Examiner* — Xiaoyun R Xu
(74) *Attorney, Agent, or Firm* — Cook Alex Ltd.

(57) ABSTRACT

A magnetic selector includes a housing configured to receive a container and having a floor upon which the container is disposed. The selector also includes a magnet carrier disposed on an opposite side of the floor from the container. The magnet carrier has at least one magnet disposed thereon and being moveable relative to the floor between a first state wherein the magnet carrier is adjacent the floor and a second state wherein the magnet carrier is spaced from the floor. The selector may include a door. The magnetic selector is usable in a fluid processing system that includes a fluid processor connectable to a source container filled with a biological fluid. A container is disposed in the magnetic selector and connected to the processor along a fluid pathway. The processor is configured to separate the biological fluid from the source container into at least two streams of material.

19 Claims, 8 Drawing Sheets

MAGNETIC SELECTOR AND SYSTEMS INCORPORATING SAME

TECHNICAL FIELD

The present disclosure is generally directed to devices using a magnetic field. More particularly, the present disclosure is directed to devices for applying a magnetic field to a fluid including cells, and systems incorporating such devices for applying a magnetic field.

BACKGROUND

The processing of biological fluid such as blood or blood components typically involves using a reusable processing apparatus ("hardware") and a disposable fluid circuit adapted for mounting or other association with the reusable apparatus. The fluid circuit typically includes containers such as plastic bags and associated tubing that defines a flow path through the circuit. The disposable fluid circuit may also include one or more separation devices where the biological fluid/cells can be separated into two or more components, washed, or otherwise processed. Separation devices may separate the biological fluid based on centrifugal separation and/or, as described below, membrane separation. Other separation devices may use magnetic fields, for example, to select and/or separate target cells. Certain systems may use a combination of these separation devices, such as described in US Pub. Nos. 2017/0315121 and 2018/0172685.

SUMMARY

In a first aspect, a magnetic selector includes a housing configured to receive a container. The housing includes a floor upon which the container is disposed. The selector also includes a magnet carrier disposed on an opposite side of the floor from the space and having at least one magnet disposed thereon. The magnet carrier is moveable relative to the floor between a first state wherein the magnet carrier is adjacent the floor and a second state wherein the magnet carrier is spaced from the floor. The selector may include a door moveable relative to the floor between an open state and a closed state wherein the container is disposed in a space between a floor surface and a facing door surface that are spaced a distance apart. According to at least one further aspect, the container may be a flexible or rigid-walled container.

In a second aspect, a fluid processing system includes a fluid processor connectable to a source container filled with a biological fluid, and configured to separate the biological fluid from the source container into at least two streams of material, a container connected to the processor along a fluid pathway, a magnetic selector including a housing configured to receive the container and a magnet carrier. The housing of the magnetic selector includes a floor upon which the container is disposed. The magnet carrier is disposed on an opposite side of the floor from the container. The magnet carrier has at least one magnet disposed thereon and is moveable relative to the floor between a first state wherein the magnet carrier is adjacent the floor and a second state wherein the magnet carrier is spaced from the floor. At least one pump is configured to transfer material between the fluid processor and the container along the fluid pathway, and at least one controller is coupled to the fluid processor, the magnetic selector, and the at least one pump. The selector may include a door moveable relative to the floor between an open state and a closed state wherein the container is disposed in a space between a floor surface and a facing door surface being a fixed distance apart. According to at least one further aspect, the container may be a flexible or rigid-walled container.

DETAILED DESCRIPTION

A more detailed description of the devices in accordance with the present disclosure is set forth below. It should be understood that the description below of specific devices is intended to be exemplary, and not exhaustive of all possible variations or applications. Thus, the scope of the disclosure is not intended to be limiting, and should be understood to encompass variations or embodiments that would occur to persons of ordinary skill in the art.

Figure 1:
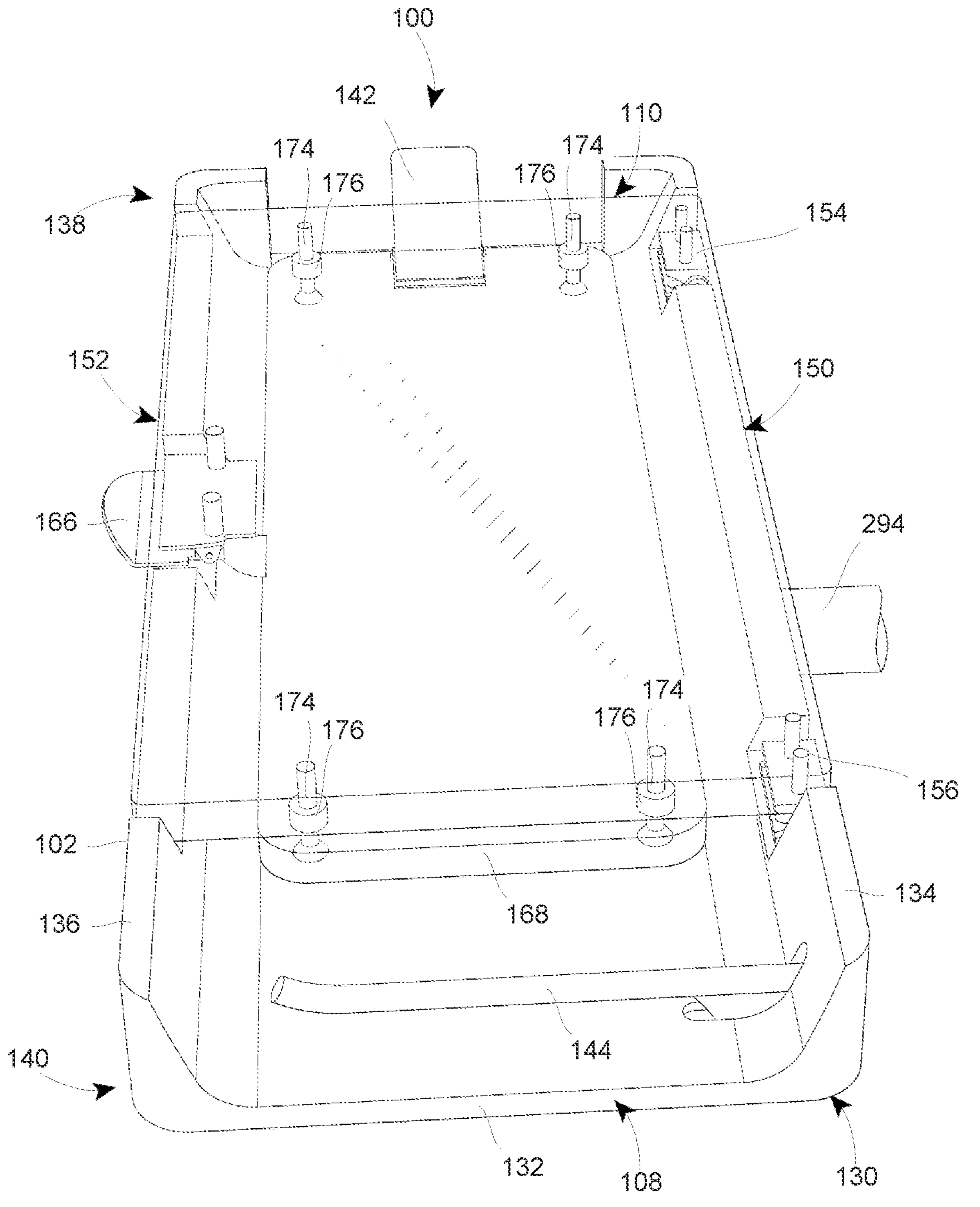
FIG. 1 is a perspective view of an embodiment of a magnetic selector, having a door in a closed state or position.

Turning first to FIG. 1, a magnetic selector 100 according to the illustrated embodiments includes a housing 102 (see, e.g., FIGS. 1 and 2) and a magnet carrier 104 (see, e.g., FIGS. 2-5). The magnetic selector 100 may also include a controller that is coupled (e.g., hardwired) to the magnet carrier 104 and that is configured to operate the magnet carrier 104 and other aspects of the magnetic selector 100. Alternatively, the magnetic selector 100 may be used with or incorporated into a fluid processing system, for example, as will be discussed below with reference to FIGS. 6-8, which fluid processing system may include a controller that is configured to operate the magnet carrier 104 and the other aspects of the magnetic selector 100.

Figure 3:
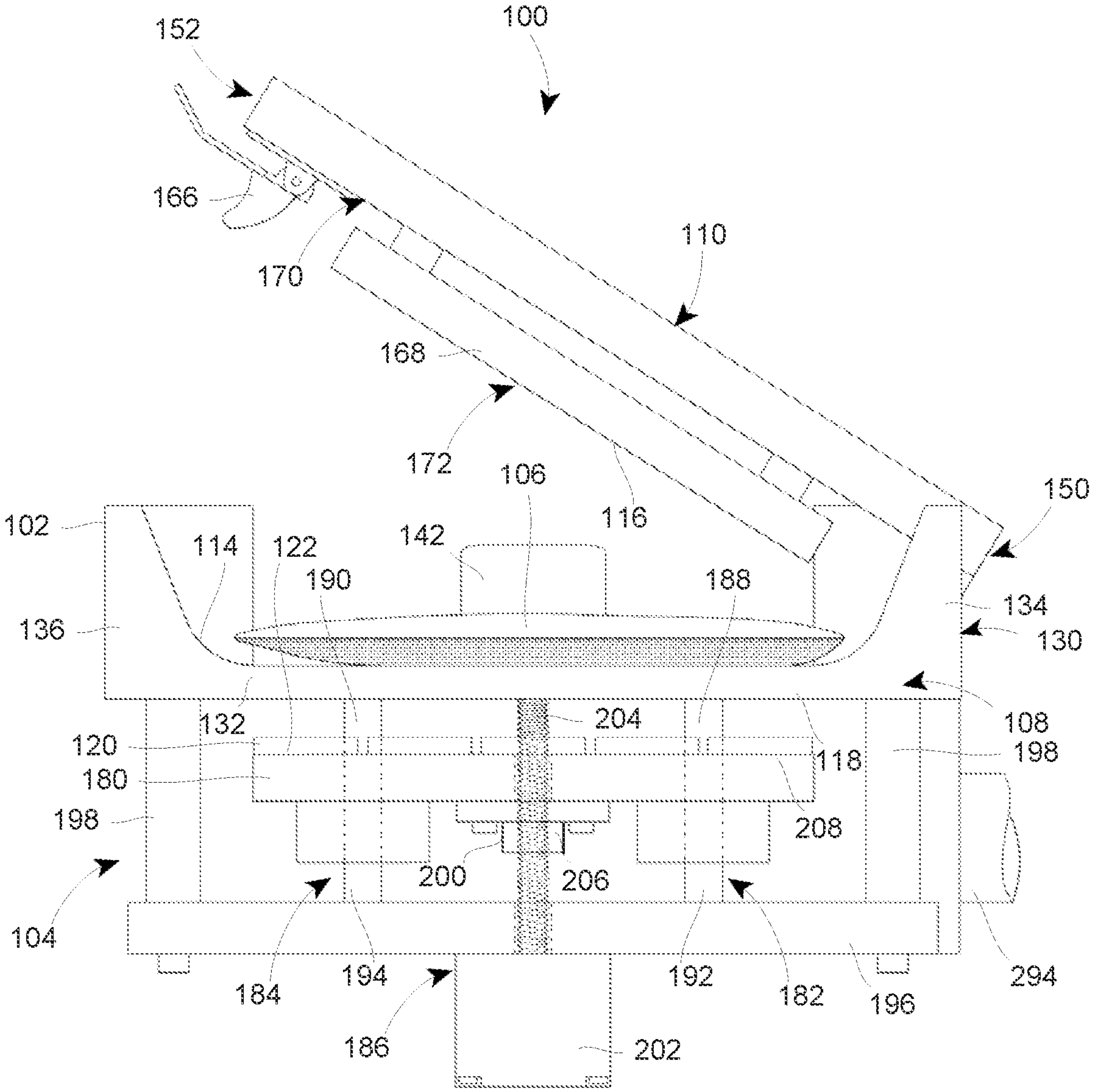
FIG. 3 is a partial cross-sectional view of the magnetic selector of FIG. 1, with the door in the open state and a magnet carrier spaced from a floor of the magnetic selector.
Figure 4:
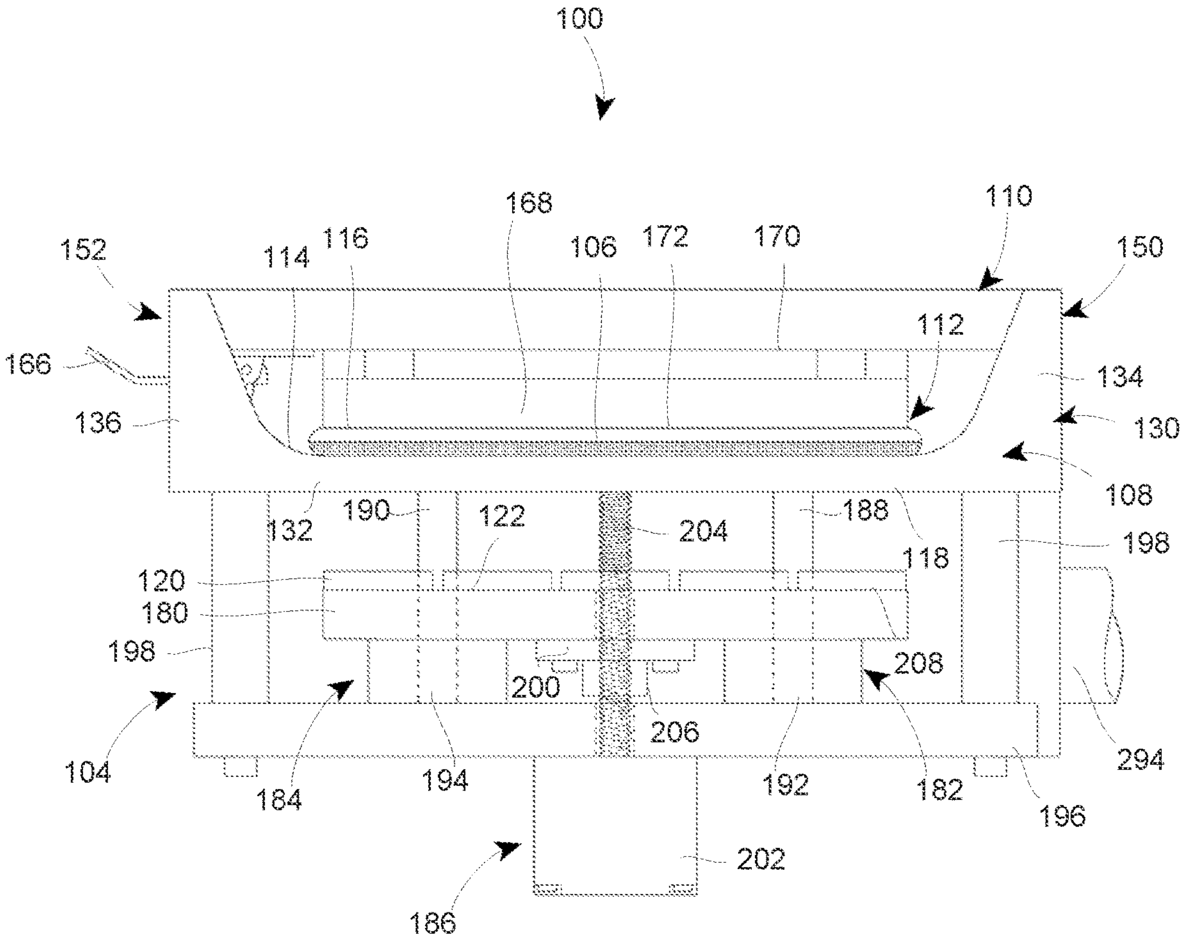
FIG. 4 is a partial cross-sectional view of the magnetic selector of FIG. 1, with the door in the closed state and the magnet carrier spaced from the floor of the magnetic selector.
Figure 5:
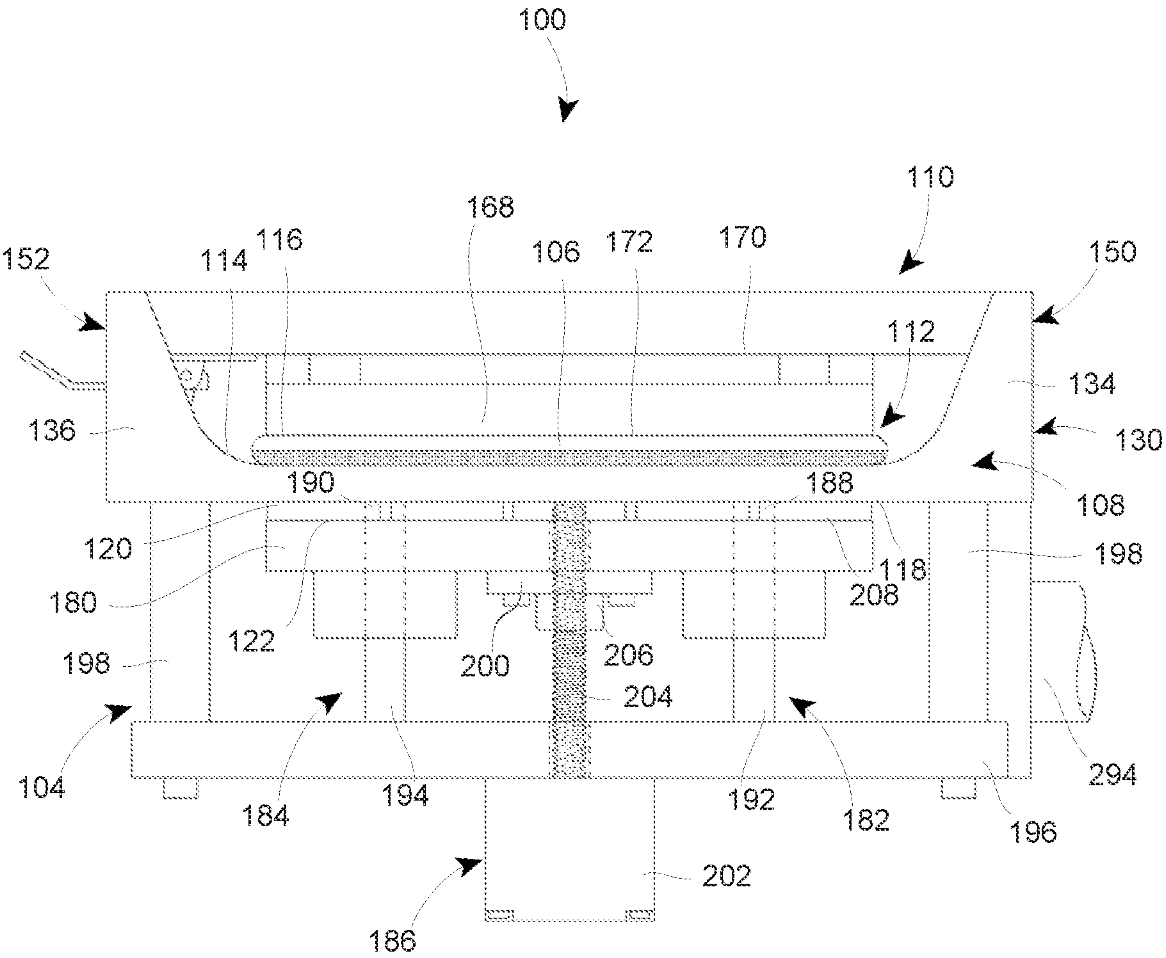
FIG. 5 is a partial cross-sectional view of the magnetic selector of FIG. 1, with the door in the closed state and the magnet carrier adjacent the floor of the magnetic selector.

The housing 102 of the magnetic selector 100 is configured to receive a container 106 (FIGS. 3-5), which may be flexible or rigid walled. As illustrated, the housing 102 includes a floor 108 upon which the container 106 is disposed. The housing may include a door 110 that is moveable relative to the floor 108. The door 110 is moveable (e.g., pivotable) between an open state (FIGS. 2 and 3) and a closed state (FIGS. 1, 4, and 5). The container 106 may be disposed in a space 112 (see, e.g., FIGS. 4 and 5) between a floor surface 114 and a facing door surface 116 that are spaced a distance apart. As such, if the container 106 is flexible, it will assume a shape that is determined by the surfaces 114, 116, as if the container were a container of fixed or rigid shape instead. Alternatively, the container may be a rigid-walled container, with a shape selected to conform to the floor surface 114 and may maintain a shape that otherwise would be imposed by the door surface 116 or a suitable alternative shape.

In the present example, the magnet carrier 104 is disposed on an opposite side 118 of the floor 108 from the container 106. See FIGS. 2-5. The magnet carrier 104 has at least one magnet 120 disposed thereon. As is illustrated herein, the at least one magnet 120 may include a plurality of magnets (e.g., permanent magnets) disposed in a two-dimensional or three dimensional array on a surface 122 of the magnet carrier 104. The magnet carrier 104 is moveable relative to the floor 108 between a first state (FIG. 5) wherein the magnet carrier 104 is adjacent (in close proximity to) the floor 108 and a second state (FIGS. 3 and 4) wherein the magnet carrier 104 is spaced from the floor 108.

The magnetic selector 100 may be used in a number of immunomagnetic procedures. In general terms, these procedures may include disposing a container 106 on the floor 108 (FIG. 3). If the container is of rigid construction, a door is not required. The procedure may require moving the magnet carrier 104 to the first state to apply a magnetic field to the fluid in the container (FIG. 5), moving the magnetic carrier 102 to the second state from the first state to disengage the magnetic field from the container (FIG. 4), and removing the container (FIG. 3).

The magnetic selector 100 also may be used with a flexible container 106 for similar procedures, as more particularly shown in the Figures. Thus, the procedures may include disposing the flexible container 106 on the floor 108 (FIG. 3), moving the door 110 from the open state to the closed state with the flexible container 106 between the floor surface 114 and the facing door surface 116 (FIG. 4), moving the magnet carrier 104 to the first state to apply a magnetic field to the fluid in the container 106 (FIG. 5), moving the magnet carrier 102 to the second state from the first state to disengage the magnetic field from the container 106 (FIG. 4), moving the door 104 to the open state and removing the flexible container 106 (FIG. 3). In fact, these procedures also may include agitating the fluid in the container 106.

The advantages of the magnetic selector 100 may include one or more of the following. Even though the container 106 may be a flexible container, by disposing the container 106 in the housing 104 with selected spacing between the floor 108 and door 110 (or the surfaces of the floor 108 and door 110), the container 106 assumes a rigid shape, permitting a more uniform fluid-gas (e.g., air) interface to be formed within the container 106 (see, e.g., FIGS. 4 and 5). This more uniform interface is of assistance where, as here, the distance of the fluid from the magnet may affect the application of the magnetic field on the fluid, and in particular on the cells within the fluid. Similar advantages may be obtained where the container is a rigid-walled container. In addition, by providing a moveable magnet carrier 104, a complicated procedure involving applying and removing magnetic fields may be automated, permitting the procedure to be carried out in a single container, as opposed to moving the fluid between containers for example, although movement of the fluids between containers is possible as well. Further, by providing the moveable magnet carrier 104 on the side opposite the container 106, the structure and operation of the magnet carrier 104 may be simplified, as opposed to one which also must accommodate for the introduction and removal of the container 106 from the housing 102 (see, e.g., FIG. 3).

Having thus described the magnetic selector 100 in general terms, as to its structure and operation, the structure of the magnetic selector 100 is now described in detail below. Further, the structure of the magnetic selector 100 is described as incorporated into a fluid processing system, and in particular a cell processing system.

Figure 2:
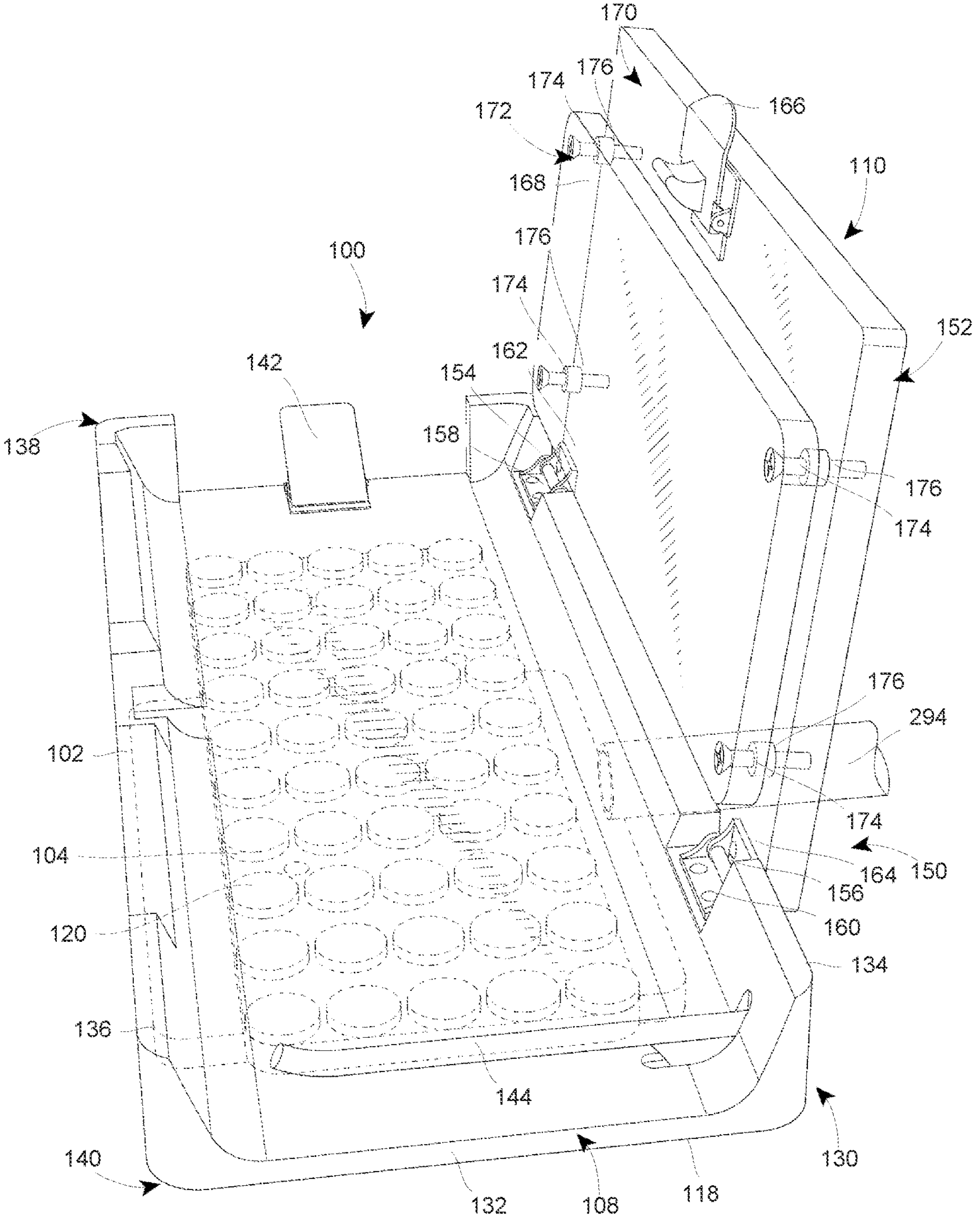
FIG. 2 is a perspective view of the magnetic selector of FIG. 1, with the door in an open state or position.

Starting first with FIGS. 1 and 2, the magnetic selector 100 of the illustrated embodiment has a housing 102 including a tray 130. The tray 130 has a bottom wall 132 that defines the floor 108, and side walls 134, 136 that depend upward from the bottom wall 132/floor 108. As illustrated, the tray 130 substantially lacks walls at either end 138, 140 (e.g., to facilitate introduction and removal of the container 106 and structures attached to the container 106), although the tray 130 may be provided with equipment at either end 138, 140 to secure the container 106 within the housing 102. For example, a clip 142 may be attached to the floor 108 at the end 138, which clip 142 may include one or more spring loaded jaws that receive an end of the container 106 therebetween to secure an end of the container 106 to the housing 102. At the other end 140 of the tray 130, a bar 144 may be attached to the floor 108 under which an opposite end of the container 106 may be passed, which end of the container 106 may have other structures (e.g., ports, such as may be configured for sampling or for access to a fluid circuit) may be disposed. According to other embodiments, the tray 130 may also have end walls at the ends 138, 140.

As will be seen in FIGS. 3-5, the side walls 134, 136 may be spaced from each other such that the container 106 is received therebetween without touching one or both the side walls 134, 136. This spacing of the side walls 134, 136, permits the container 106 to be disposed between the floor 108 and the door 110 into a more uniform shape (compare FIG. 3 with FIGS. 4 and 5). While the amount of change in the shape of the flexible container 106 may be less than that illustrated in FIGS. 3-5, one will recognize that the distances between various points within the container 106, and in particular along a fluid-gas (e.g., air) interface within the container 106, will be more uniform when the door 110 is moved into its closed state (e.g., FIGS. 4 and 5). As mentioned above, the container may alternatively be a rigid-walled container, in which case the door 110 may be optional because the advantages of having the container conform to the tray 130 and door 110 may be achieved through the rigid wall construction of the container.

The door 110 is pivotally mounted along one edge 150 to a first of the side walls (e.g., side wall 134) and has an opposing edge 152 abutting a second of the side walls (e.g., side wall 136) opposite the first of the side walls (134) in the closed state (see FIGS. 1, 4, and 5). As best seen In FIGS. 1 and 2, the housing 102 may include one or more hinges 154, 156 that are attached at a first end 158, 160 to the side wall 134 and that are attached a second end 162, 164 to the door 110. This permits the door 110 to pivot or rotate between the open state (e.g., FIG. 2) and the closed state (FIG. 1). The door 110 may also include a latch 166 disposed along the edge 152, which latch 166 may cooperate with the side wall 136 to maintain the door 110 in the closed state.

There is a distance between the floor surface 114 and the facing door surface 116 that is determined at least in part by a height of the first and second side walls 134, 136. As illustrated in the Figures, and in particular FIGS. 3-5, the portion of the surfaces 114, 116 abutting the container 106 are flat and parallel such that the fixed distance is uniform between those surfaces 134, 136 from side wall 134 to side wall 136 and from end 138 to end 140. This arrangement provides for a fluid-gas interface within the container 106 that is a spaced distance from the floor surface 114 that is uniform from side wall 134 to side wall 136 and from end 138 to end 140. It will be recognized that changes in the surfaces 114, 116 could provide a fixed distance, but one that is not uniform between those surfaces 114, 116 from side wall 134 to side wall 136 and from end 138 to end 140. As such, the flexible container 106 would still be forced into a shape like a rigid container, but with different distances relative to the floor surface 114, which might be desirable with a different arrangement of magnets than is illustrated herein, for example.

As is also illustrated in the Figures, the door 110 may include a spacer 168 disposed on a surface 170 of the door 110 facing the floor surface 114 with the door 110 in the closed state (see, e.g., FIG. 4). The spacer 168 has a spacer surface 172 that faces the floor surface 114 with the door 110 in the closed state, the facing door surface 116 including the spacer surface 172. As illustrated in the Figures, the spacer surface 172 is coextensive with the facing door surface 116. It will be recognized that according to other embodiments, the spacer 168 may not be included, in which case the surface 170 may be coextensive with the facing door surface 116.

The spacer 168 may be removeable, such that the spacer 168 may be included or not, to accommodate containers 106 of differing sizes, for example. The spacer 168 may also be adjustable, such that the fixed distance between the floor surface 114 and door surface 116 may be changed. For example, as illustrated, the spacer 168 is attached to the surface 170 of the door 110 through the use of four fasteners 174 located at the corners of the spacer 168. As can be seen, for example in FIG. 2, the spacer 168 does not abut the surface 170 (although it could according to other embodiments), but a post 176 is disposed between the corners of the spacer 168 and the surface 170. The height of the post 176 determines in part (along with the thickness of the spacer 168, for example) the distance between the surfaces 114, 116. By removing a post of a first height and replacing it with a post of a second height, the distance between the surfaces 114, 116 may be changed. This adjustment also may permit accommodation of containers 106 of differing sizes.

It will be further recognized that the adjustment of the spacer 168 to vary the distances 114, 116 may be provided by other mechanisms, such as an adjustable screw at each of the corners of the spacer 168, for example. The adjustment may even be automated according to certain embodiments, wherein a motor is used to operate the adjustable screw or screws, a fashion similar to that of the linear actuator described below in regard to the magnet carrier 104.

Moving to FIGS. 3-5, the magnet carrier 104 may include a plate 180 on which the at least one magnet 120 is disposed. The plate 180 is translatably attached to the floor 108 to translate between a first state (FIG. 5) and the second state (FIGS. 3 and 4). As mentioned previously, the magnet carrier 104 may be coupled to a controller, which controller automatically translates the plate 180 between the first and second states according to a procedure (e.g., a procedure programmed into the controller).

As is illustrated, the magnet carrier 104 includes a plurality of linear bearings 182, 184 and a linear actuator 186. The linear bearings 182, 184 are attached at one end 188, 190 to the floor 108, and the plate 180 is mounted on the linear bearings 182, 184. As is illustrated in FIGS. 3-5, the other end 192, 194 of the bearings 182, 184 is attached to a support plate 196 that is secured to the floor 108 by a plurality of posts 198. The linear actuator 186 is attached to the plate 180 at 200, and the linear actuator 186 is configured to move the plate 180 along the linear bearings 182, 184 between the first state and the second state. As is illustrated in FIGS. 3-5, the linear actuator 186 may include a motor 202 that is mounted on the support plate 196, and that rotates a lead screw 204 that is received in a nut 206 secured to the plate 180, the rotation of the lead screw 204 and its cooperation with the nut 206 causing the plate 180 to move between the first and second states, or positions.

As was mentioned above, the at least one magnet 120 may include a plurality of magnets, as illustrated in FIGS. 2-5. The array 120 may be two-dimensional where a surface 208 of the plate 180 is flat, or may be three-dimensional where the surface 208 of the plate 180 is not flat or where the individual magnets are mounted on posts of varying heights, for example. According to the illustrated embodiments, the at least one magnet 120 may be a permanent magnet, although according to other embodiments the magnets 120 may be electromagnets instead.

In operation, the operator, also referred to as the user, may open the door 110 by first opening the latch 166 and rotating the door 110 about its hinges 154, 156. The user may then dispose the flexible container 106 on the floor 108 (FIG. 3), and secure the container 106 in place using the clip 142 and bar 144. The user may then move the door 110 from the open state to the closed state, with the flexible container 106 between the floor surface 114 and the facing door surface 116 (e.g., FIG. 4). At this time, the magnet carrier 104 may be in the second state as illustrated.

The magnet carrier 104 then may be moved, for example automatically by an electronic controller, to the first state to apply a magnetic field to the fluid in the container 106 (FIG. 5). This may be performed by causing the motor 202 to rotate the lead screw 204 in a first direction. The magnet carrier 104 may remain in the first state for a period of time. The magnet carrier 104 may then be moved to return to the second state from the first state to disengage the magnetic field from the container 106 (FIG. 4), after which the user may move the door 110 to the open state and remove the flexible container 106 (FIG. 3).

It will be understood that other steps may precede those mentioned in the preceding two paragraphs. Further, other steps may be performed between those states described. Finally, other steps may occur after the states described above.

Figure 6:
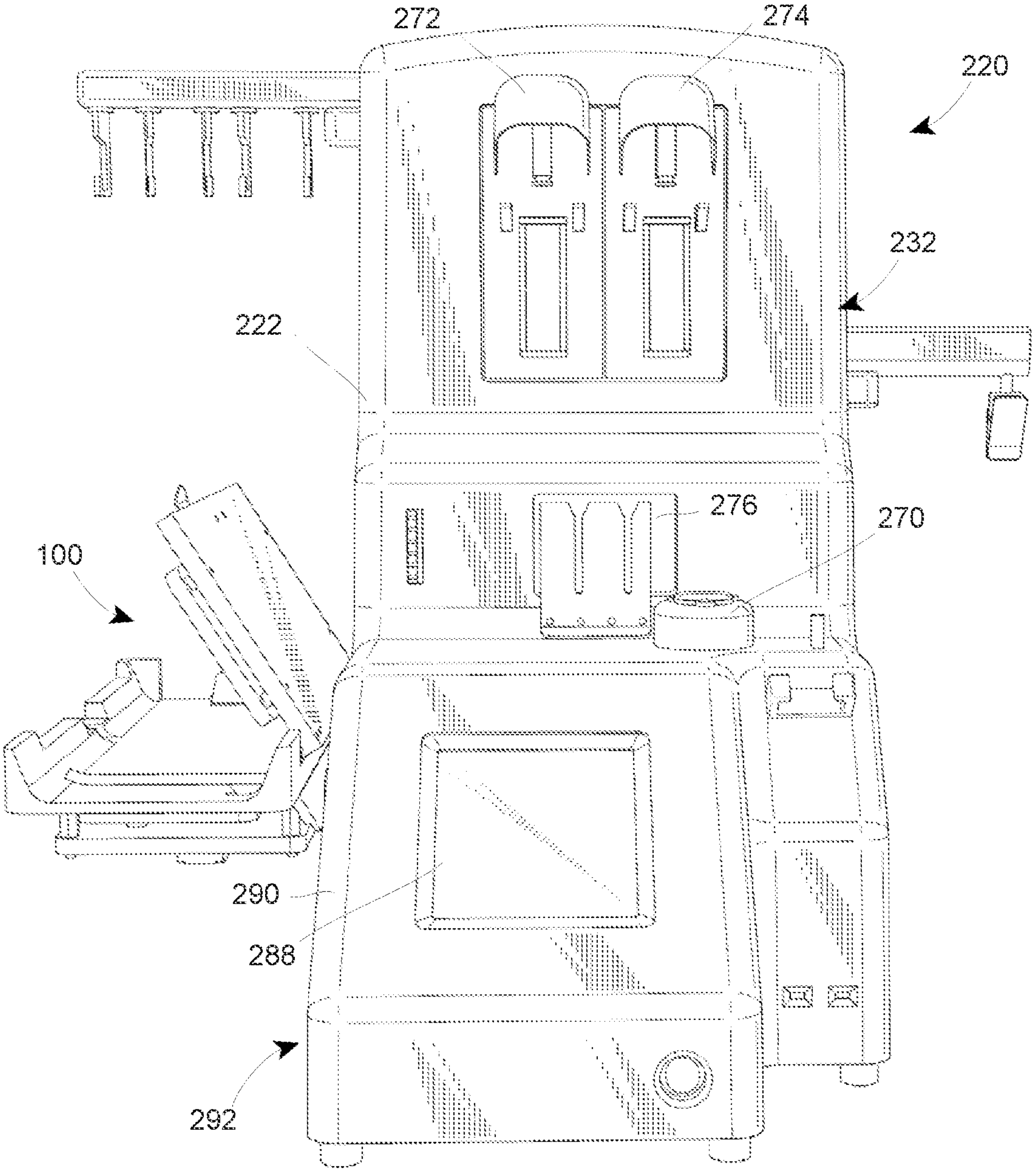
FIG. 6 is a perspective view of a fluid processing system incorporating the magnetic selector of FIG. 1, with a fluid circuit removed and the door of the magnetic selector in the open state or position.
Figure 7:
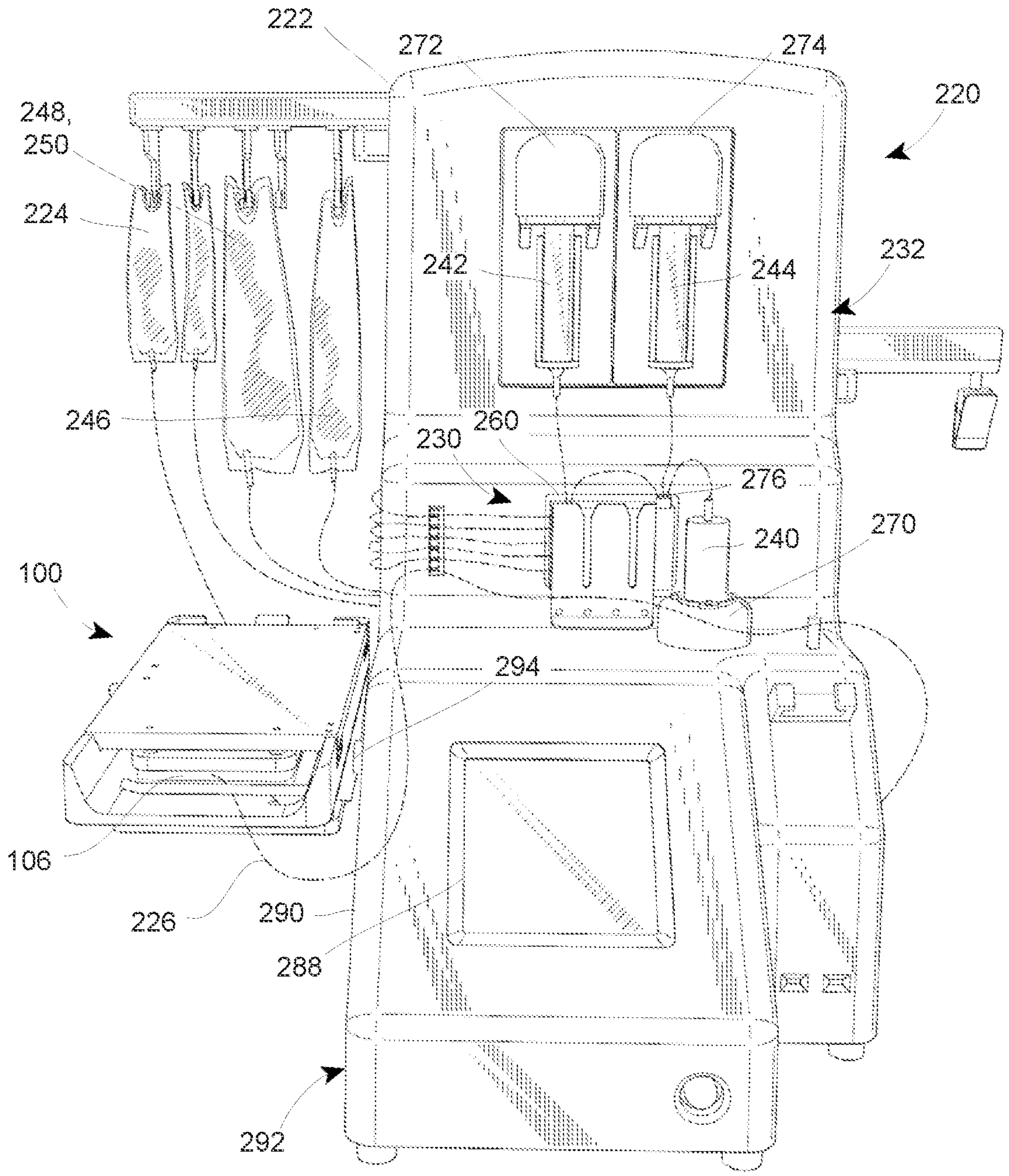
FIG. 7 is a perspective view of the fluid processing system of FIG. 6, with the fluid circuit mounted and the door of the magnetic selector in the closed state or position.

While it is possible to use the magnetic selector independently, it is also possible to use the selector in combination with or as incorporated into a fluid processing system, such as a cell processing system. For example, FIGS. 6 and 7 illustrate the selector 100 as incorporated into a fluid processing system, such as the processing system disclosed in US Pub. No. 2021/0046426, which reference is incorporated herein in its entirety. It is also possible too that the magnetic separator 100 may be used with other processing systems, such as are described in US Pub. Nos. 2017/0315121 and 2018/0172685 in combination with other magnetic separators or selectors.

According to such an embodiment, as may be seen in FIG. 7, a fluid processing system 220 includes a fluid processor 222 connectable to a source container 224 filled with a biological fluid, and configured to separate the biological fluid from the source container 224 into at least two streams of material. "Biological fluid" includes without limitation blood and blood components, and "cell" or "biological cell" includes without limitation blood cells, such as red cells, white cells, and platelets. The processor 222 is connected to the container 106 disposed in the magnetic selector 100 along a fluid pathway 226.

The processor 222 includes a disposable fluid circuit (also referred to as a set or kit) 230 used in combination with reusable processing machine, or hardware 232. The circuit 230 may be a "closed" system or circuit, in which the interior of the system, e.g., the flow paths, container, etc., are not exposed or "opened" to the outside environment; the circuit 230 may be referred to as closed even where additional containers are attached to the circuit 230, for example before or during a procedure. A control unit (or controller) 234 (see FIG. 8) is coupled to the processor 222, including the circuit 230 and hardware 232. The controller 234 is configured to operate the processor 230, and hardware 232 according to a procedure or process to produce or generate a product in combination with the selector 100. For example, the magnetic selector 100 may be included as part of the system 220 to provide an additional selection of cells of interest or target cells, which target cells were initially separated from a biological fluid by the processor 230, 232.

As seen in FIGS. 6 and 7, the disposable fluid circuit 230 is connectable to the source container 224 of fluid, in particular biological fluid. The disposable fluid circuit 230 includes a spinning membrane separator 240 that is used to process the fluid received from the source container 224. The flow of fluid from the source container 224, through the spinning membrane separator 240, and to the one or more containers, such as the container 106, is achieved through the use of first and second syringes 242, 244, which are in fluid communication with the source container 224, the spinning membrane separator (or spinning membrane for short) 240, and the container 106. The syringes 242, 244 also may be in fluid communication with a number of other containers 246, 248, 250.

The flow of the fluid between the containers 224, 106, 246, 248, 250, the spinning membrane 240, and the syringes 242, 244 is controlled using a flow control cassette 260, which cassette 260 may be connected to each of the foregoing by tubing, or lines. In addition, the cassette 260 may include internal flow paths that are defined in part by a plurality of separate channels or passages, which in turn may be contained within and may be defined by the structure (e.g., housing) of the cassette 260. The channels may be connected at a plurality of selectable junctions, which may control the flow of fluid from one channel to another. These selectable junctions may also be referred to as valves, valve stations, or clamps, because, as illustrated, the selectable junctions provide controlled access between the channels. The cassette 260 may also include sensor stations, by which sensors may be associated with the flow paths within the cassette 260 to determine characteristics of the flow therein, such as pressure. Preferably, the length of each of the lines and channels is kept as short as possible to further minimize the internal volume of the fluid circuit 230.

As illustrated in FIG. 7, the spinning membrane 240 and the syringes 242, 244 may be integrally formed as part of (i.e., as one piece with) the cassette 260, to further reduce the tubing volume associated with the kit 230. According to other embodiments, the spinning membrane 240 and/or the syringes 242, 244 may be attached to the remainder of the fluid circuit 230 at the time of use, as may be the case with one or more of the containers 224, 106, 246, 248, 250. Again, as illustrated in FIG. 7, the container 246 and container 106 may be integrally formed with the cassette 260.

Figure 8:
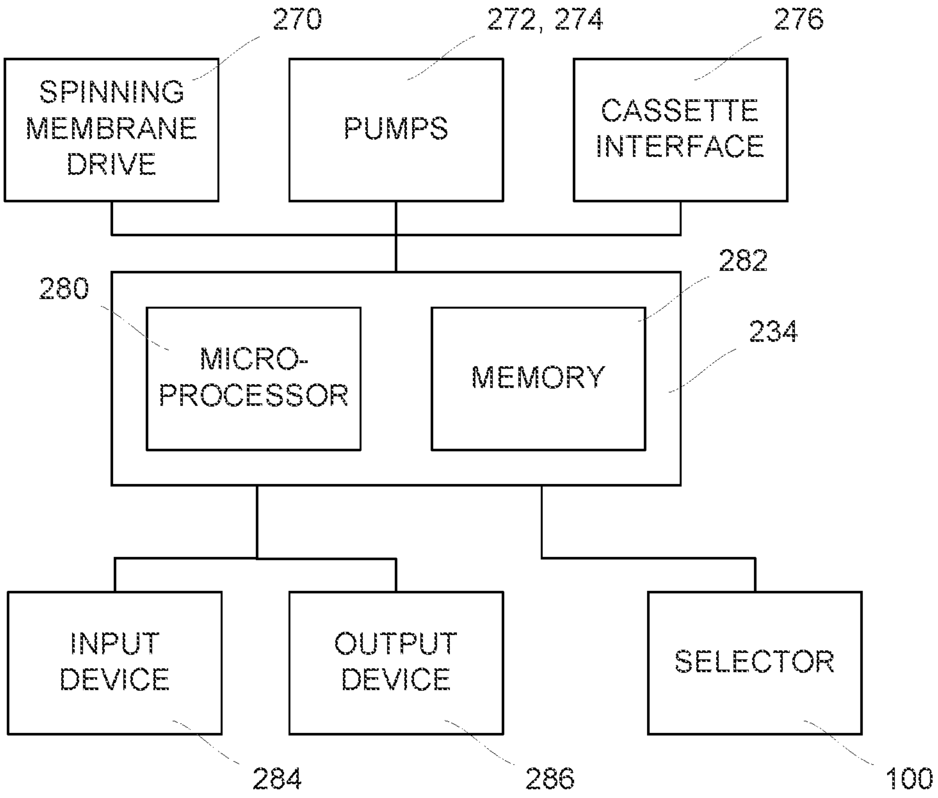
FIG. 8 is a block diagram of a controller used in conjunction with the other elements of the system of FIG. 6.

As seen in FIGS. 6-8, the reusable hardware component (or reusable hardware for short) 232 includes a drive 270 for the spinning membrane separator 240, a syringe pump 272, 274 for each respective syringe 242, 244, and a control cassette interface 276 that is associated with the flow control cassette 260 when the fluid circuit 230 is disposed on the hardware 232 (e.g., is mounted on the hardware 232). The cassette interface 276 includes actuators and sensors that are associated with the clamps and sensor stations of the flow control cassette 260, and are configured to operate the clamps or sense characteristics of the fluid, respectively.

The reusable hardware 232 is coupled to the controller 234 which is configured to control operation of the system 220. The controller 234 may include a microprocessor 280 (which, in fact may include multiple physical and/or virtual processors). According to other embodiments, the controller 234 may include one or more electrical circuits designed to carry out the actions described herein. In fact, the controller 234 may include a microprocessor 280 and other circuits or circuitry. In addition, the controller 234 may include at least one memory 282. The instructions by which the microprocessor 280 is programmed may be stored on the at least one memory 282 associated with the microprocessor 280, which at least one memory 282 may include one or more tangible non-transitory computer readable memories, having computer executable instructions stored thereon, which when executed by the microprocessor 280, may cause the microprocessor 280 to carry out one or more actions as described herein.

As mentioned above, the controller 234 may be coupled (i.e., directly or indirectly connected) to the equipment of the reusable hardware 232, such as the spinning membrane drive 270, the first syringe pump 272, the second syringe pump 274, and the cassette interface 276. The controller 234 may operate each of these devices, each of which may be an assembly of other devices or equipment, to cause the fluid to flow through the fluid circuit 230 associated with the hardware 232, for example to cause fluid to flow from the source container 224, through the spinning membrane 240, and eventually into the container 106.

For example, the controller 234 may be programmed to perform a process or procedure according to a protocol, such as to wash particular cells contained in the fluid within the source container 224, before they are directed to the container 106. The controller 234 may be programmed to perform other actions as well, such as to test the fluid circuit 230, to prime the fluid circuit 230, to rinse parts of the circuit 230 after the wash has been performed, and to add other components to the cell-containing fluid before that fluid is distributed to the container 106.

As is also illustrated in FIG. 8, the controller 234 may be coupled to one or more of the structures described above, for example to receive information (e.g., in the form of signals) from these structures or to provide commands (e.g., in the form of signals) to these structures to control the operation of the structures. As illustrated, the controller 234 may be coupled to at least one input device 284 to receive information from that device and to at least one output device 286 to provide information to that device. The at least one input device 284 may include a number of different devices according to the embodiments described herein. For example, the input device 284 may include a keyboard or keypad by which a user may provide information and/or instructions to the controller 234.

Alternatively, the input device 284 may be a touch screen, such as may be used in conjunction with an output device 286 in the form of a video display. For instance, the illustrated embodiment in FIGS. 6 and 7 includes such a touch sensitive display screen 288 mounted to a front panel 290 of a housing 292 of the system 220. The input device may also include a reader or scanner, such as a barcode reader or scanner or an RFID reader. According to still other embodiments, the input device may be in the form of computer equipment that permits the cell processing system including the controller 234 to communicate (whether via wires, cables, etc. or wirelessly) with other processing systems over a local network, or with other cell processing systems or other computer equipment (e.g., a server) over local networks, wide area networks, or the Internet. According to such an embodiment, the input may include an internal transmitter/receiver device.

The controller 234 may also be coupled to the magnetic selector 100, and in particular the magnet carrier 104. The controller 234 may be configured to move the magnet carrier 104 between the first state wherein the magnet carrier 104 is adjacent the floor 108 and the second state wherein the magnet carrier 104 is spaced from the floor 108. In particular, the controller 234 may be coupled to the motor 202 of the linear actuator 186, and may operate the motor 202 to drive the plate 180 between the two states or positions.

According to one embodiment of an automated method of operating the system 220, and of operating the magnetic selector 100 that is incorporated into the system 220, the magnetic selector 100 is used to select target cells using a magnetic field. By "automated" or "automatically," it is meant that the system (and in particular controller 234) can be programmed to carry out the processing steps of a processing method without substantial operator/user involvement. Of course, even in the automated system of the present disclosure, it will be understood that user activity may be involved, including the loading of the disposable fluid circuits and entering processing parameters. Additional manual steps may be required, as well, and there may be opportunities for reconfiguration of certain steps in a process. However, the reusable apparatus can process the biological fluid through the disposable circuit(s) described below without substantial user intervention.

According to the above description, portions of the present disclosure may be discussed more generally with a focus on use of the magnetic selector 100. For instance, a magnetic selector 100, whether used independently or as part of a system 220, may be used with a fluid that has been combined with other solutions to prepare target cells for selection.

For example, a monoclonal antibody solution may be introduced to the solution containing the target cells, and incubated for a period of time to allow for interaction between the monoclonal antibodies in the solution and the target cells (which may be white blood cells of a particular phenotype, such as CD34+ peripheral blood stem cells, CD3+/CD28+ T-cell lymphocytes, and CD8+ plasma B-cells, which cells may also be referred to as target cells). The spinning membrane separator 240 may be used to mix the cells and then to wash the cells, removing any unbound monoclonal antibodies.

At this point, a non-specific magnetic particle solution (e.g., a magnetic bead solution or magnetic reagent, such as ferrofluid (FF)) may be introduced to the suspension, incubated for a period of time to allow for interaction between the ferrofluid and the non-specific end of the monoclonal antibodies, mixed and (optionally) washed to remove any unbound ferrofluid.

According to one embodiment, the operator may manually inject a monoclonal antibody (mAb) solution into the solution containing the target cells; for example, an introducer container may be attached to a container either prior to the procedure or in a sterile manner during the procedure and the mAb solution is injected into the container from the introducer container. According to other embodiments, the monoclonal antibody may be introduced automatically into the container. The contents of the container may be permitted to remain in the container for a period of time to allow for interaction between the monoclonal antibodies and the target cells. As part of the incubation step, the spinning membrane separator 240 may be operated to mix the suspension in the container to improve the interaction between the monoclonal antibodies and target cells. For example, the spinning membrane 101 may be operated at a speed of between 500-700 rpm. According to one embodiment, the total incubation time (including time spent mixing the contents of the in-process container) may be thirty minutes, while the incubation temperature may be room temperature.

At this point in the embodiment, the operator may manually inject a ferrofluid (FF) into the container; for example, an introducer container. For example, an introducer container (not shown) may be attached to the container either prior to the procedure or in a sterile manner during the procedure and the ferrofluid is injected into the container from the introducer container. According to other embodiments, the ferrofluid may be introduced automatically into the container. The contents of the container may be permitted to remain in the container (incubated) for a period of time to allow for interaction between the monoclonal antibodies and the magnetic particles (e.g., beads) in the ferrofluid. Again, the spinning membrane separator 240 may be operated to mix the suspension in the in-process container to improve the interaction between the monoclonal antibodies and magnetic particles. Transfer of fluid from one or both of the wash solution containers 248, 250 may occur at this time to optimize the volume for incubation.

Alternatively, the monoclonal antibody and the magnetic particles may be combined prior to introduction into the container 106. In this case, the combination of the monoclonal antibody and the magnetic particles may be incubated with the cells to form the complex in a single set of steps, as opposed to the two related sets of the steps outlined above.

As mentioned above, the selector 100 may utilize agitation. To permit the fluid in the container 106 to be agitated, the selector 100 may be mounted on a shaft 294 that depends from the housing 292. The shaft 294 is attached to a motor mounted in the housing 292, which motor may cause the shaft to rotate in opposite directions about an axis of the shaft. As a consequence, the fluid in the container 106 may be agitated in an oscillatory fashion.

The mounting of the selector 100 on the shaft 294 may also permit the container 106 to be disposed at an angle to the horizontal, instead of having the container disposed such that the container is level with the horizontal. For example, the selector 100 may be oriented relative to the horizontal such that the selector 100 is disposed at 30 degrees to the horizontal. Of course, this could be achieved in a standalone version of the selector 100 as well, either by providing a mechanism (such as a pivot) that permits the selector 100 (or the floor surface 114) to be at a variable degree of orientation to the horizontal (or vertical) or a mechanism (such as an inclined plane) that permits the selector 100 to be at a particular degree of orientation to the horizontal (or vertical).

Thus, an improved device for applying a magnetic field to a container having disposed therein a fluid including cells is discussed herein, and the magnetic selector may be utilized independently or incorporated into a system for processing a biological fluid. The description provided above, and the other aspects provided below, are intended for illustrative purposes, and are not intended to limit the scope of the disclosure to any particular method, system, apparatus, or device described herein.

Other Aspects

Aspect 1. A magnetic selector comprising:

a housing configured to receive a flexible container, the housing including a floor upon which the container is disposed;

a magnet carrier disposed on an opposite side of the floor from the container; and the magnet carrier having at least one magnet disposed thereon and carrier being moveable relative to the floor between a first state wherein the magnet carrier is adjacent the floor and a second state wherein the magnet carrier is spaced from the floor.

Aspect 2. The magnetic selector according to aspect 1, wherein the container comprises a container, and the housing further comprises and a door moveable relative to the floor between an open state and a closed state with the container disposed in a space between a floor surface and a facing door surface that are spaced a distance apart.

Aspect 3. The magnetic selector according to aspect 2, wherein:

the housing further comprises a tray, the tray having a bottom wall that defines the floor and side walls that depend upward from the floor, the door being pivotally mounted along one edge to a first of the side walls and having an opposing edge abutting a second of the side walls opposite the first of the side walls in the closed state, the distance between the floor surface and the facing door surface determined at least in part by a height of the first and second side walls.

Aspect 4. The magnetic selector according to aspect 3, wherein the door comprises a spacer disposed on a surface of the door facing the floor surface with the door in the closed state, the spacer having a spacer surface that faces the floor surface with the door in the closed state, the facing door surface comprising the spacer surface.

Aspect 5. The magnetic selector according to aspect 4, wherein the spacer is removably attached to the door.

Aspect 6. The magnetic selector according to aspect 4, wherein the spacer is adjustably attached to the door.

Aspect 7. The fluid processing system according to aspect 1, wherein the container comprises a rigid-walled or flexible container Aspect 8. The magnetic selector according to aspect 1, wherein the magnet carrier comprises a plate on which the at least one magnet is disposed, the plate being translatably attached to the floor and translatable between the first state and the second state.

Aspect 9. The magnetic selector according to aspect 8, wherein the magnet carrier comprises:

a plurality of linear bearings attached at one end to the floor, the plate mounted on the linear bearings; and a linear actuator attached to the plate, the linear actuator configured to move the plate along the linear bearings between the first state and the second state.

Aspect 10. The magnetic selector according to aspect 1, wherein the at least one magnet is a permanent magnet.

Aspect 11. The magnetic selector according to aspect 1, wherein the at least one magnet comprises a plurality of magnets disposed in a two-dimensional or three-dimensional array on the plate.

Aspect 12. A fluid processing system comprising:

a fluid processor connectable to a source container filled with a biological fluid, and configured to separate the biological fluid from the source container into at least two streams of material;

a container connected to the processor along a fluid pathway, a magnetic selector comprising a housing configured to receive the container and a magnet carrier, the housing including a floor upon which the container is disposed, the magnet carrier disposed on an opposite side of the floor from the container;

the magnet container having at least one magnet disposed thereon and being moveable relative to the floor between a first state wherein the magnet carrier is adjacent the floor and a second state wherein the magnet carrier is spaced from the floor;

at least one pump configured to transfer material between the fluid processor and the container along the fluid pathway; and at least one controller coupled to the fluid processor, the magnetic selector, and the at least one pump.

Aspect 13. The fluid processing system according to aspect 12, wherein the housing further comprises a door moveable relative to the floor between an open state and a closed state with the container disposed in the space between a floor surface and a facing door surface that are spaced a distance apart.

Aspect 14. The fluid processing system according to aspect 13, wherein:

the housing further comprises a tray, the tray having a bottom wall that defines the floor and side walls that depend upward from the floor, the door being pivotally mounted along one edge to a first of the side walls and having an opposing edge abutting a second of the side walls opposite the first of the side walls in the closed state, the distance between the floor surface and the facing door surface determined at least in part by a height of the first and second side walls.

Aspect 15. The fluid processing system according to aspect 14, wherein the door comprises a spacer disposed on a surface of the door facing the floor surface with the door in the closed state, the spacer having a spacer surface that faces the floor surface with the door in the closed state, the facing door surface comprising the spacer surface.

Aspect 16. The magnetic selector according to aspect 15, wherein the spacer is adjustably attached to the door.

Aspect 17. The fluid processing system according to aspect 12, wherein the container comprises a flexible or rigid-walled container.

Aspect 18. The fluid processing system according to aspect 12, wherein the magnet carrier comprises a plate on which the at least one magnet is disposed, the plate translatably attached to the floor to translate between the first state and the second state.

Aspect 19. The fluid processing system according to aspect 18, wherein the magnet carrier comprises:

a plurality of linear bearings attached at one end to the floor, the plate mounted on the linear bearings; and a linear actuator attached to the plate, the linear actuator configured to move the plate along the linear bearings between the first state and the second state.

Aspect 20. The fluid processing system according to aspect 12, wherein the at least one magnet is a permanent magnet.

Aspect 21. The fluid processing system according to aspect 12, wherein the at least one magnet comprises a plurality of magnets disposed in a two-dimensional or three-dimensional array on the plate.

The invention claimed is:

1. A magnetic selector comprising:

a housing configured to receive a container, the housing including a floor upon which the container is disposed and a door movable relative to the floor between an open state and a closed state with the container disposed in a space between a floor surface and a facing door surface being spaced a distance apart;

a magnet carrier disposed on an opposite side of the floor from the container; and the magnet carrier having at least one magnet disposed thereon and being moveable relative to the floor between a first state wherein the magnet carrier is adjacent the floor and applies a magnetic field to the container and a second state wherein the magnet carrier is spaced from the floor and disengages the magnetic field from the container.

2. The magnetic selector according to claim 1, wherein:

the housing further comprises a tray, the tray having a bottom wall that defines the floor and side walls that depend upward from the floor, the door being pivotally mounted along one edge to a first of the side walls and having an opposing edge abutting a second of the side walls opposite the first of the side walls in the closed state, the distance between the floor surface and the facing door surface determined at least in part by a height of the first and second side walls.

3. The magnetic selector according to claim 2, wherein the door comprises a spacer disposed on a surface of the door facing the floor surface with the door in the closed state, the spacer having a spacer surface that faces the floor surface with the door in the closed state, the facing door surface comprising the spacer surface.

4. The magnetic selector according to claim 3, wherein the spacer is removably attached to the door.

5. The magnetic selector according to claim 3, wherein the spacer is adjustably attached to the door.

6. The fluid processing system according to claim 1, wherein the container comprises a flexible or rigid-walled container.

7. The magnetic selector according to claim 1, wherein the magnet carrier comprises a plate on which the at least one magnet is disposed, the plate being translatably attached to the floor and translatable between the first state and the second state.

8. The magnetic selector according to claim 7, wherein the magnet carrier comprises:

a plurality of linear bearings attached at one end to the floor, the plate mounted on the linear bearings; and a linear actuator attached to the plate, the linear actuator configured to move the plate along the linear bearings between the first state and the second state.

9. The magnetic selector according to claim 1, wherein the at least one magnet is a permanent magnet.

10. The magnetic selector according to claim 1, wherein the at least one magnet comprises a plurality of magnets disposed in a two-dimensional or three-dimensional array on the plate.

11. A fluid processing system comprising:

a fluid processor connectable to a source container filled with a biological fluid, and configured to separate the biological fluid from the source container into at least two streams of material;

a container connected to the processor along a fluid pathway, a magnetic selector comprising a housing configured to receive the container and a magnet carrier, the housing including a floor upon which the container is disposed and a door movable relative to the floor between an open state and a closed state with the container disposed in a space between a floor surface and a facing door surface being spaced a distance apart, the magnet carrier disposed on an opposite side of the floor from the container;

the magnet container having at least one magnet disposed thereon and being moveable relative to the floor between a first state wherein the magnet carrier is adjacent the floor and applies a magnetic field to the container and a second state wherein the magnet carrier is spaced from the floor and disengages the magnetic field from the container;

at least one pump configured to transfer material between the fluid processor and the container along the fluid pathway; and at least one controller coupled to the fluid processor, the magnetic selector, and the at least one pump.

12. The fluid processing system according to claim 11, wherein:

the housing further comprises a tray, the tray having a bottom wall that defines the floor and side walls that depend upward from the floor, the door being pivotally mounted along one edge to a first of the side walls and having an opposing edge abutting a second of the side walls opposite the first of the side walls in the closed state, the distance between the floor surface and the facing door surface determined at least in part by a height of the first and second side walls.

13. The fluid processing system according to claim 12, wherein the door comprises a spacer disposed on a surface of the door facing the floor surface with the door in the closed state, the spacer having a spacer surface that faces the floor surface with the door in the closed state, the facing door surface comprising the spacer surface.

14. The magnetic selector according to claim 13, wherein the spacer is adjustably attached to the door.

15. The fluid processing system according to claim 11, wherein the container comprises a flexible or rigid-walled container.

16. The fluid processing system according to claim 11, wherein the magnet carrier comprises a plate on which the at least one magnet is disposed, the plate translatably attached to the floor to translate between the first state and the second state.

17. The fluid processing system according to claim 16, wherein the magnet carrier comprises:

a plurality of linear bearings attached at one end to the floor, the plate mounted on the linear bearings; and a linear actuator attached to the plate, the linear actuator configured to move the plate along the linear bearings between the first state and the second state.

18. The fluid processing system according to claim 11, wherein the at least one magnet is a permanent magnet.

19. The fluid processing system according to claim 11, wherein the at least one magnet comprises a plurality of magnets disposed in a two-dimensional or three-dimensional array on the plate.

* * * * *